United States Patent Office 3,849,544

Patented Nov. 19, 1974

3,849,544

COMPOUND $Cd_2Os_2O_7$ HAVING PYROCHLORE CRYSTAL STRUCTURE

Arthur W. Sleight, Wilmington, Del., assignor to E. I. du Pont de Nemours and Company, Wilmington, Del.

No Drawing. Filed Feb. 15, 1973, Ser. No. 332,579
Int. Cl. C01g *55/00*
U.S. Cl. 423—593 2 Claims

ABSTRACT OF THE DISCLOSURE $Cd_2Os_2O_7$ has pyrochlore crystal structure and is a bistable electrical switching element.

BACKGROUND OF THE INVENTION

Field of the invention

This invention concerns cadmium osmium oxide of pyrochlore type crystal structure and its use as a bistable electrical switching element.

Prior art

Over a hundred oxides are known that crystallize in the pyrochlore type structure. Such oxides have an approximate formula which can be generalized as $A_2M_2O_7$. The structure is characterized by a cubic unit cell having a cell edge of about 10 A. and symmetry corresponding to space group $Fd_3m$. The many possibilities of cation and anion substitution, as well as vacancies in either the cation sublattice (short of the composition $AM_2O_7$) or the anion content (short of the composition $A_2M_2O_6$), have been discussed by Aleshin and Roy J. Amer. Ceramic Soc., *45,* 18–25 (1962).

Of particular and recent importance have been the precious metal pyrochlores $A_2M_2O_{7-z}$ where M comprises one or more of the platinum group metals particularly Ru or Ir, A comprises particularly Pb or Bi and $z$ ranges from 0 to about 1. The important feature of these compositions is their metallic conductivity as discussed, e.g. by Longo et al. in Materials Research Bulletin, vol. 4, pp. 191–202 (1969). Besides being good metallic conductors, many of these precious metal pyrochlores have special value because their electrical conductivity is particularly constant and unchanging with wide changes in temperature. Certain bismuth-containing precious metal pyrochlores having this advantage are described in U.S. Pats. 3,583,931 to Bouchard and 3,553,109 to Hoffman, both of common assignee with this application.

Summary of the invention

It has now been discovered that in contrast to the pyrochlore compositions known to the art, new cadmium osmium oxides of pyrochlore type structure have unusually large and sudden changes in electrical conductivity that make them useful elements in temperature sensitive electrical switches.

The product of this invention is the cadmium osmium oxide having the approximate formula $Cd_2Os_2O_7$ and having the pyrochlore-type crystal structure with space group Fd3m.

It will be appreciated by one skilled in the art of inorganic chemistry that the precision of usual analytical techniques often precludes an exact determination of stoichiometry. Recourse is normally had to chemical or structural inference to define the stoichiometry in terms of small integral numbers. With compounds of elements such as osmium having multiple oxidation states the inference is more difficult, and it is most difficult where metallic bonding is prevalent and oxidation states, if meaningful at all, may have non-integral valves. Thus, in the present case within the constraints imposed by analytical accuracy and the known properties of the pyrochlore structure the stoichiometry may be stated to be within the limits given by the formula $Cd_{2-x}Os_2O_{7-y}$ where $x$ and $y$ are independently in the range 0 to about 0.5.

The pyrochlore structure of $Cd_2Os_2O_7$ is evidenced by an X-ray diffraction pattern at room temperature identifying a cubic lattice, the diffraction pattern having the systematic absences characteristic of the face-centered array of cations and the space group Fd3m. The size of the cubic cell from X-ray diffraction is 10.17±0.01 A. This X-ray diffraction pattern is shown in Table 1.

TABLE 1

X-ray pattern of $Cd_2Os_2O_7$

| Reflection, hkl | Spacing, A. | Intensity |
|---|---|---|
| 111 | 5.87 | Medium (M.) |
| 311 | 3.07 | M. |
| 222 | 2.94 | Very strong. |
| 400 | 2.54 | Strong (S.). |
| 331 | 2.33 | Very weak (V.W.). |
| 422 | 2.08 | V.W. |
| 511 | 1.96 | Weak (W.). |
| 440 | 1.80 | S. |
| 531 | 1.72 | W. |
| 620 | 1.61 | V.W. |
| 533 | 1.55 | W. |
| 622 | 1.53 | S. |
| 444 | 1.47 | Do. |
| 711 | 1.42 | W. |
| 731 | 1.32 | Do. |

The diffraction pattern is quite analogous to that of the only known pyrochlores of osmium, $Pb_2Os_2O_7$ and $Tl_2Os_2O_7$ as reported by Sleight et al. in Materials Research Bulletin, *6,* 775–784 (1971).

Another pyrochlore analog with similar X-ray pattern has also been discovered in $Ca_2Os_2O_7$ with a unit cell of 10.22 A. The similarity in ionic size and chemistry of $Ca^{+2}$, $Cd^{+2}$ and $Pb^{+2}$ indicates that solid solutions will form in which one of these type A cations can be partially substituted by one or more of the other two ions.

There has also been discovered the new cadmium pyrochlore oxide $Cd_2Ru_2O_7$, having a cubic cell of 10.14 A. Similarities in size and chemistry indicate that solid solutions will form in which a portion of the osmium in $Cd_2Os_2O_7$ is replaced by rhenium, ruthenium or iridium.

The $Pb_2Os_2O_7$ and $Tl_2Os_2O_7$ known to the art are excellent metallic conductors at room temperature and below. The novel $Cd_2Ru_2O_7$ is also found to be a good electrical conductor at all temperatures measured $$(\rho 298°\ K.=4\times 10^{-3}\ \text{ohm cm.}).$$

In contrast, however, the pyrochlore oxide of this invention containing both cadmium and osmium is a bistable conductive element showing good metallic conduction at temperatures above about 225° K. and semi-conductive behavior at lower temperatures. The resistivity of $Cd_2Os_2O_7$ at 100° K., measured on an individual crystal, is about 0.15 ohm cm. At the transition temperature of about 225° K. the change in electrical conductivity is abrupt, changing by about two orders of magnitude or more over a switching range of less than 10° K.

The exact temperature at which the transition from semi-conductive to metallic behavior occurs will be sensitive to changes in composition. Thus because of adventitious impurities one crystal or one specimen of compacted particles may show a slightly different transition temperature from another made under different conditions. This will readily be controlled by normal preparative procedures. It will also be apparent that small but purposeful modifications in composition may be used to modify the transition from the region of about 225° K. observed for pure $Cd_2Os_2O_7$.

The switching behavior is quite reversible and may be carried out repeatedly at substantially the same temperature. The electrical transition is not accompanied by a catastrophic crystal transformation. At room temperature where the structure is characterized the lattice is clearly of the pyrochlore type. No significant change in structure or form has been noted after the pyrochlore specimen has been cycled through the lower semi-conductive temperature range. A thermal effect has been noted near the temperature of electrical transition by differential thermal analysis so that a minor change such as crystallographic ordering of the structure may occur at the transition.

While compacted powders of cadmium osmium oxide produce useful changes in conductivity the sharpness of the transition is maximized by using a single crystal of the oxide as the switching element.

A single crystal of cadmium osmium oxide with electrical leads attached, e.g. by well known conductive cements, provides a useful electrical switch. The switch may be operated directly in response to a change in ambient temperature. For example, in a low temperature refrigeration system the switchable crystal can form an element of a conductive circuit for a cooling compressor. At temperatures below a set point near 225° K. the highly resistive crystal would draw little current whereas at higher temperature the now-conductive circuit might institute a cooling sequence. The switchable crystal may alternatively be used to switch in response to a voltage surge which is sufficient to raise the crystal temperature by resistive heating into the highly conductive temperature range. For example, the switchable crystal maintained at low temperature may be used in a shunt circuit to protect associated electronic equipment from an overload voltage.

The pyrochlore oxides are generally prepared by direct combination of the metal oxides at temperatures of 800–1200° C. The reaction may normally be carried out under atmospheric pressures. Where one or more of the reactants is volatile or where the product is not stable at a temperature of rapid reaction a pressurized reaction may be used. Thus, the novel $Cd_2Ru_2O_7$ cannot be prepared at ambient pressure. It can be prepared, however, by heating CdO and $RuO_2$ at 700° C. under hydrothermal conditions at 3000 atmospheres in the presence of a source of oxygen such as $KClO_3$. The pyrochlores of osmium pose special problems because of the volatility and extreme toxicity of $OsO_4$ which may be used as a reactant or may be formed upon free exposure to oxygen at high temperature and ambient pressure. On this account closed systems should be used for forming the osmium pyrochlore oxides, and $OsO_4$ if used as a reactant should be handled under conditions where it is adequately condensed (the boiling point of $OsO_4$ is 135° C.) and with good ventilation to protect personnel. In handling pressurized vessels consideration should be given to possible release of $OsO_4$ upon accidental rupture. The most convenient source of osmium is the metal because of its availability; osmium dioxide may also serve as a source material. CdO or the powdered metal is the most convenient source of cadmium.

Finely divided osmium metal or $OsO_2$ may be heated with stoichiometric amounts or a slight excess of CdO (or CaO if $Ca_2Os_2O_7$ is to be made) at a temperature of about 700–800° C. under oxygen pressure. A small quantity of water may be used to provide hydrothermal conditions for crystal growth.

Reaction may be carried out in a sealed tube without added oxygen if the correct oxygen stoichiometry is maintained by initially providing $OsO_4$ and Os in the proper ratio to attain an average oxidation state of 5 for osmium.

The pyrochlore oxides of the invention are obtained as black crystals or as a sintered powder. Excess CdO (or CaO) may be removed by washing with dilute (1/1) HCl which also removes any $OsO_4$.

SPECIFIC EMBODIMENTS OF THE INVENTION

The following are illustrative examples in which all parts are by weight unless otherwise stated.

EXAMPLE 1

1.3314 g. of Os metal was placed in a silica tube. At another place in the tube, 0.1902 g. of Os metal and 0.8992 g. of Cd metal were placed. The region of the tube containing the 1.3314 g. of Os metal was heated to 300° C. under pure oxygen. This Os was converted to $OsO_4$ which condensed in another region of the tube that was water-cooled. The tube was then evacuated and sealed off. Thus, an ampoule was produced which contained Cd, Os, and $OsO_4$ in the molar proportions 8:1:7 respectively. The ampoule was heated at 800° C. for several days. After cooling to room temperature the tube was opened to reveal some unreacted cadmium and $OsO_4$ as well as a few gold colored crystals of $OsO_2$. The major product was small black crystals. After washing with water the black crystals showed an X-ray pattern typical of a pyrochlore type structure having a face centered cubic cell with edge $=10.17\pm.01$ A.

EXAMPLE 2

0.6421 g. of CdO, 1.1110 g. of $OsO_2$, 0.2043 g. of $KClO_3$, and 1 ml. of water were sealed together in a gold tube (3/8" dia. by 5" long). The tube was heated at 700° C. under 3000 atm. of external pressure for 8 hours. The product was a black powder. The X-ray pattern was essentially identical to that of Example 1 except that a small impurity of $OsO_2$ ($\sim$5%) was detected.

Oxygen analyses on this product showed 15.55, 14.99, and 15.27% oxygen as compared to the 15.62% calculated for $Cd_2Os_2O_7$.

EXAMPLE 3

Electrical resistivity of $Cd_2Os_2O_7$ crystals

A crystal from Example 1 was cut into a bar, and electrodes were attached by means of conductive silver paste. At room temperature the resistivity was $2.7\times10^{-4}$ ohm-cm., but on further cooling the resistivity rapidly increased. At 100° K. the resistivity was $1.5\times10^{-1}$ ohm-cm.

Another crystal of $Cd_2Os_2O_7$ from a similar preparation was also measured. It showed very similar behavior with an abrupt transition in electrical resistivity at 225° K. The small but distinct difference in transition temperature between crystals of different origin indicates an influence of very slight composition variations.

EXAMPLE 4

$Cd_2Os_2O_7$ as a bistable varistor

A crystal of $Cd_2Os_2O_7$ was placed in a 150° K. environment. A voltage was applied and gradually increased. As the voltage was increased from zero, the current increased smoothly up to about 240 millivolts when it suddenly jumped, in less than half a second, from about 120 milliamperes to over 1100 milliamperes. This switching behavior was found to be reversible.

The embodiments of the invention in which an exclusive property or privilege is claimed are defined as follows:

1. A composition having pyrochlore crystal structure of the formula $$Cd_{2-x}Os_2O_{7-y}$$

wherein $x$ and $y$ independently are in the range 0 to about 0.5.

2. $Cd_2Os_2O_7$ having pyrochlore crystal structure.

References Cited

UNITED STATES PATENTS

| | | | |
|---|---|---|---|
| 3,553,109 | 1/1971 | Hoffman | 423—593 UX |
| 3,560,144 | 2/1971 | Sleight | 423—593 |

OTHER REFERENCES

Sleight (B), "Materials Research Bulletin," vol. 6, 1971, pp. 775–780.

Sleight et al., "Materials Research Bulletin," vol. 6, 1971, pp. 781–784.

Aleshin et al., "Journal of American Ceramic Society," vol. 45, 1962, pp. 18–25.

HERBERT T. CARTER, Primary Examiner

U.S. Cl. X.R.

252—518, 62.3R